United States Patent
Umehara (10) Patent No.: US 11,056,721 B2
(45) Date of Patent: Jul. 6, 2021

(54) METHOD AND DEVICE FOR PRODUCING ELECTRODE BODY

(71) Applicant: TOYOTA JIDOSHA KABUSHIKI KAISHA, Aichi-ken (JP)

(72) Inventor: Masakazu Umehara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 581 days.

(21) Appl. No.: 15/890,564

(22) Filed: Feb. 7, 2018

(65) Prior Publication Data

US 2018/0241088 A1    Aug. 23, 2018

(30) Foreign Application Priority Data

Feb. 17, 2017 (JP) .............................. JP2017-027911

(51) Int. Cl.

| H01M 10/0583 | (2010.01) |
|---|---|
| H01M 4/36 | (2006.01) |
| H01M 10/058 | (2010.01) |
| H01M 10/42 | (2006.01) |
| H01M 50/403 | (2021.01) |
| H01M 50/46 | (2021.01) |
| H01M 4/02 | (2006.01) |

(52) U.S. Cl.
CPC ....... *H01M 10/0583* (2013.01); *H01M 4/366* (2013.01); *H01M 10/058* (2013.01); *H01M 10/4235* (2013.01); *H01M 50/403* (2021.01); *H01M 50/461* (2021.01); *H01M 2004/027* (2013.01)

(58) Field of Classification Search
CPC .... H01M 2/145; H01M 2/168; H01M 10/058; H01M 10/4235
See application file for complete search history.

(56) References Cited

U.S. PATENT DOCUMENTS

| 2007/0072083 | A1 | 3/2007 | Ikuta et al. | |
|---|---|---|---|---|
| 2009/0325058 | A1 | 12/2009 | Katayama et al. | |
| 2010/0136394 | A1* | 6/2010 | Miyahisa | H01M 10/0431 429/94 |
| 2011/0052987 | A1* | 3/2011 | Katayama | H01M 2/1646 429/221 |
| 2012/0258348 | A1* | 10/2012 | Hayakawa | H01M 2/1686 429/144 |

(Continued)

FOREIGN PATENT DOCUMENTS

| CN | 1816922 A | 8/2006 |
|---|---|---|
| CN | 101617433 A | 12/2009 |

(Continued)

*Primary Examiner* — Stephan J Essex
(74) *Attorney, Agent, or Firm* — Sughrue Mion, PLLC (57) ABSTRACT

There is provided a method for producing an electrode body including a current collection foil, an electrode mixture layer, a heat resistant layer, and a separator layer are laminated in this order. The method includes applying a liquid heat resistant material forming the heat resistant layer to the electrode mixture layer on an electrode plate that is obtained by forming an electrode mixture layer on the current collection foil and disposing the porous separator layer on the liquid heat resistant material before the liquid heat resistant material according to the application is dried after applying the liquid heat resistant material.

10 Claims, 5 Drawing Sheets

(56) References Cited

U.S. PATENT DOCUMENTS

| | | | | |
|---|---|---|---|---|
| 2014/0272523 A1* | 9/2014 | Otsuka | ............... | C08L 27/16 |
| | | | | 429/126 |
| 2014/0302389 A1* | 10/2014 | Hasegawa | ............ | H01M 4/666 |
| | | | | 429/209 |
| 2017/0018818 A1 | 1/2017 | Miura et al. | | |

FOREIGN PATENT DOCUMENTS

| CN | 101675544 A | 3/2010 |
|----|-------------|---------|
| JP | 2003208918 A | 7/2003 |
| JP | 2005174792 A | 6/2005 |
| JP | 2013-218913 A | 10/2013 |
| JP | 2017-027928 A | 2/2017 |

* cited by examiner

HIGH VISCOSITY OR
HIGH SURFACE TENSION

FIG. 4

LOW VISCOSITY OR
LOW SURFACE TENSION

METHOD AND DEVICE FOR PRODUCING ELECTRODE BODY

INCORPORATION BY REFERENCE

The disclosure of Japanese Patent Application No. 2017-027911 filed on Feb. 17, 2017 including the specification, drawings and abstract is incorporated herein by reference in its entirety.

BACKGROUND

1. Technical Field

The present disclosure relates to a method and a device for producing an electrode body of a battery including a current collection foil and an electrode mixture layer are laminated, and more specifically, relates to a method of producing an electrode body in which a portion functioning as a separator layer is included and laminated in an electrode laminate of a battery.

2. Description of Related Art

In secondary batteries and various types of other batteries, generally, an electrode laminate in which positive and negative electrode bodies are laminated is used as a power generation element. Each of the electrode bodies constituting the electrode laminate has a sheet form in which an electrode mixture layer is laminated on a current collection foil. In addition, in the electrode laminate, a separator for preventing direct contact between the positive electrode body and the negative electrode body is also laminated. As the related art of such an electrode body, Japanese Unexamined Patent Application Publication No. 2013-218913 (JP 2013-218913 A) may be exemplified. In this document, the provision of a heat resistant layer on one side of a separator is described in claim 1.

SUMMARY

However, the related art has the following problems. The productivity of the electrode laminate is not favorable. The separator is generally in a form of a flexible film. Therefore, it is difficult to perform an operation of laminating it together with positive and negative electrode bodies. Thus, it is conceivable to integrate a separator into one of the electrode bodies in advance. However, as described above, there is a need for a heat resistant layer to be interposed between the separator and the electrode body. In this case, the adhesiveness between the heat resistant layer and the separator is not necessarily favorable. Thus, it is not possible to easily produce an electrode body including a heat resistant layer and a separator in an integrated manner.

The present disclosure provides a method and a device for producing an electrode body through which it is possible to produce an electrode body that includes a heat resistant layer and a separator layer in an integrated manner and has excellent adhesiveness therebetween.

According to a first aspect of the present disclosure, there is provided a method for producing an electrode body. A method for producing an electrode body including a current collection foil, an electrode mixture layer, a heat resistant layer, and a porous separator layer are laminated in this order includes applying a liquid heat resistant material forming the heat resistant layer to the electrode mixture layer on a current collection foil and disposing the porous separator layer on the liquid heat resistant material before the liquid heat resistant material is dried after applying the liquid heat resistant material.

In the first aspect, first, coating is performed on the electrode plate. That is, the heat resistant layer is formed on the electrode mixture layer using the liquid heat resistant material. The heat resistant layer immediately after formation is in a wet state in which a solvent component is included. Then, the porous separator layer is disposed thereon before the heat resistant layer is dried. In this manner, the porous separator layer is bonded to and disposed on the wet heat resistant layer. Thereby, an electrode body having excellent adhesiveness between the heat resistant layer and the porous separator layer is obtained.

The first aspect may include drying the liquid heat resistant material after disposing the porous separator layer. When the liquid heat resistant material is applied, an uneven shape including a concave portion and a convex portion may be formed on a surface of the liquid heat resistant material on the electrode mixture layer. A concave portion in the uneven shape functions as a discharge path for the solvent component when the heat resistant layer formed of the liquid heat resistant material is dried after disposing the separator layer. Therefore, a time required for drying the liquid heat resistant material after disposing the separator layer can be shortened.

In the first aspect, the uneven shape of the liquid heat resistant material may include the concave portion that is continuous and a plurality of the convex portions that is discrete. When such an uneven shape pattern is used, vertical and horizontal discharge paths for the solvent component are secured during drying, and an effect of shortening the drying time is strong.

In the first aspect, the convex portion may be linear, the concave portions may be linear, and the uneven shape of the liquid heat resistant material may include a strip shape.

In the first aspect, a solvent component of the liquid heat resistant material may include an additive for lowering a surface tension of the liquid heat resistant material, and an amount of the additive may be 30 weight % or less. Accordingly, the solvent component in a liquid phase of the liquid heat resistant material can pass through pores in the porous separator layer and can be discharged during drying. Therefore, it is possible to obtain an effect of shortening the drying time.

In the first aspect, a viscosity of the liquid heat resistant material may be 100 mPa·s or more.

In the first aspect, the liquid heat resistant material may include water as a solvent component.

In the first aspect, a width of the convex portion may be 500 μm or less.

In the first aspect, a distance between a first surface of a convex portion with which the porous separator layer comes in contact and a second surface of the concave portion faced on the porous separator layer may be at least 1.5 times as long as a distance between the mixture layer and the second surface, and the distance between the mixture layer and the second surface may be 2 μm or more.

In the first aspect, the additive may be ethanol.

In the first aspect, an amount of the additive may be 5 weight % or more.

A second aspect of the present disclosure is provided a device for producing an electrode body including a current collection foil, an electrode mixture layer, a heat resistant layer, and a separator layer are laminated in that order. The device for producing the electrode body includes an electrode plate supply unit configured to supply an electrode plate. The electrode plate includes the current collection foil on which the electrode mixture layer is located. A coating unit is disposed at a downstream side of the electrode plate supply unit. The coating unit is configured to apply a liquid heat resistant material forming the heat resistant layer on the electrode mixture layer of the electrode plate supplied from the electrode plate supply unit. A bonding unit is disposed at a downstream side of the coating unit. The bonding unit is configured to place the separator layer on the heat resistant layer by bonding the electrode plate and a porous separator film before the liquid heat resistant material applied by the coating unit is dried. A separator supply unit is disposed at an upstream side of the bonding unit. The separator supply unit is configured to supply the separator film to the bonding unit. A drying unit is disposed at a downstream side of the bonding unit. The drying unit is configured to dry the electrode body formed by the bonding unit.

In such a configuration, there is provided a method for producing an electrode body through which it is possible to produce an electrode body that includes a heat resistant layer and a separator layer in an integrated manner and has excellent adhesiveness therebetween.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Specific embodiments of the present disclosure will be described below in detail with reference to the appended drawings. First, an outline of a facility for performing a method of producing an electrode body of the present embodiment will be described with reference to FIG. 1. The facility in FIG. 1 includes a coating unit 1, a bonding unit 2, and a drying unit 3, and further includes an original plate supply unit (electrode plate supply unit) 4 and a separator supply unit 5. Thereby, an electrode body 6 having a structure shown in a sectional view in FIG. 2 is produced. The electrode body 6 shown in FIG. 2 includes a current collection foil 7, an electrode mixture layer 8, a heat resistant layer 9, and a separator layer 10 (porous separator layer).

Returning to FIG. 1, the original plate supply unit 4 supplies an electrode plate 11, which is an original plate, to the coating unit 1. The electrode plate 11 is obtained by forming the electrode mixture layer 8 on a surface of the current collection foil 7. In the coating unit 1, a coating process of forming the heat resistant layer 9 on a surface of the electrode mixture layer 8 of the electrode plate 11 is performed. Therefore, an electrode plate 12 taken out of the coating unit 1 includes the heat resistant layer 9 on the surface of the electrode mixture layer 8. The electrode plate 12 is supplied to the bonding unit 2. A separator film 13 from the separator supply unit 5 is also supplied to the bonding unit 2. In the bonding unit 2, a separator layer disposing process of bonding the separator film 13 to the heat resistant layer 9 of the electrode plate 12 is performed. Therefore, the separator film 13 becomes the separator layer 10. The electrode body 6 obtained in this manner is subjected to a drying process performed by the drying unit 3.

Figure 1:
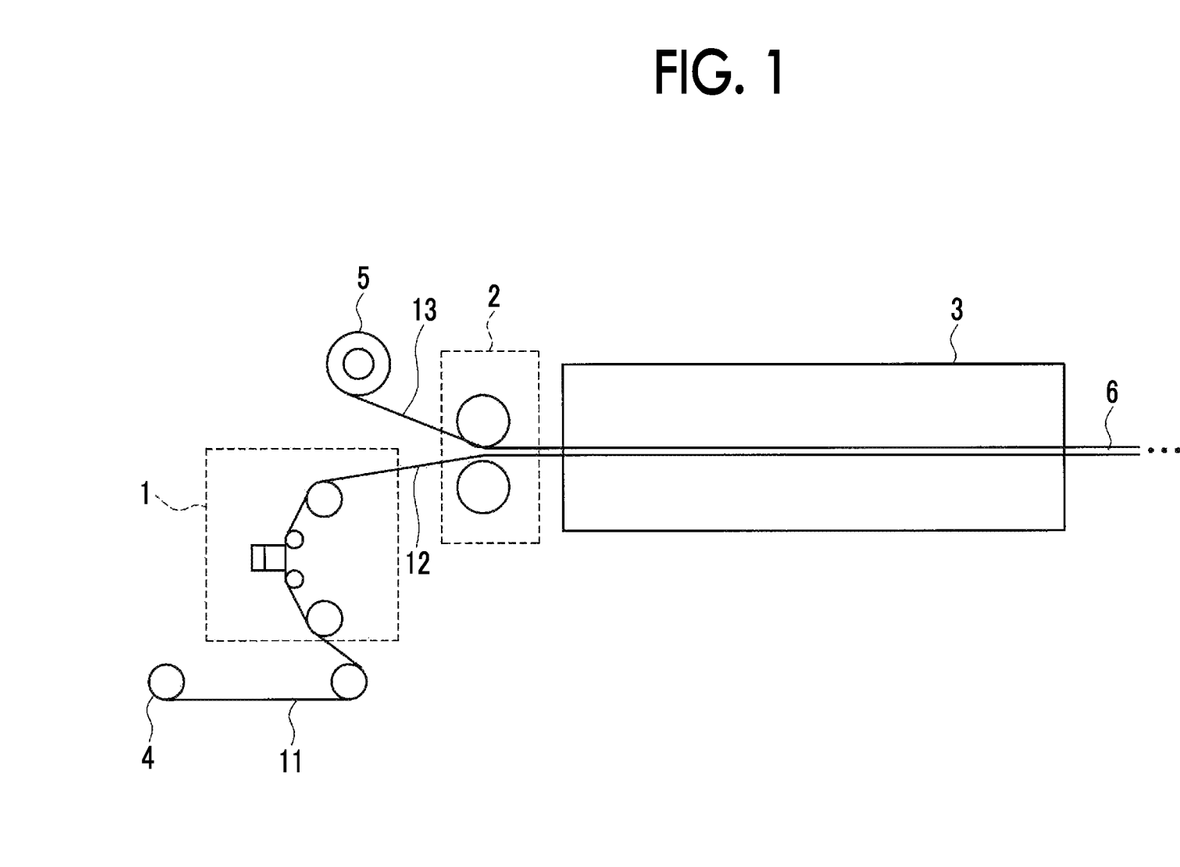
FIG. 1 is a front view showing an outline of a facility for performing a method of producing an electrode body according to an embodiment.
Figure 2:
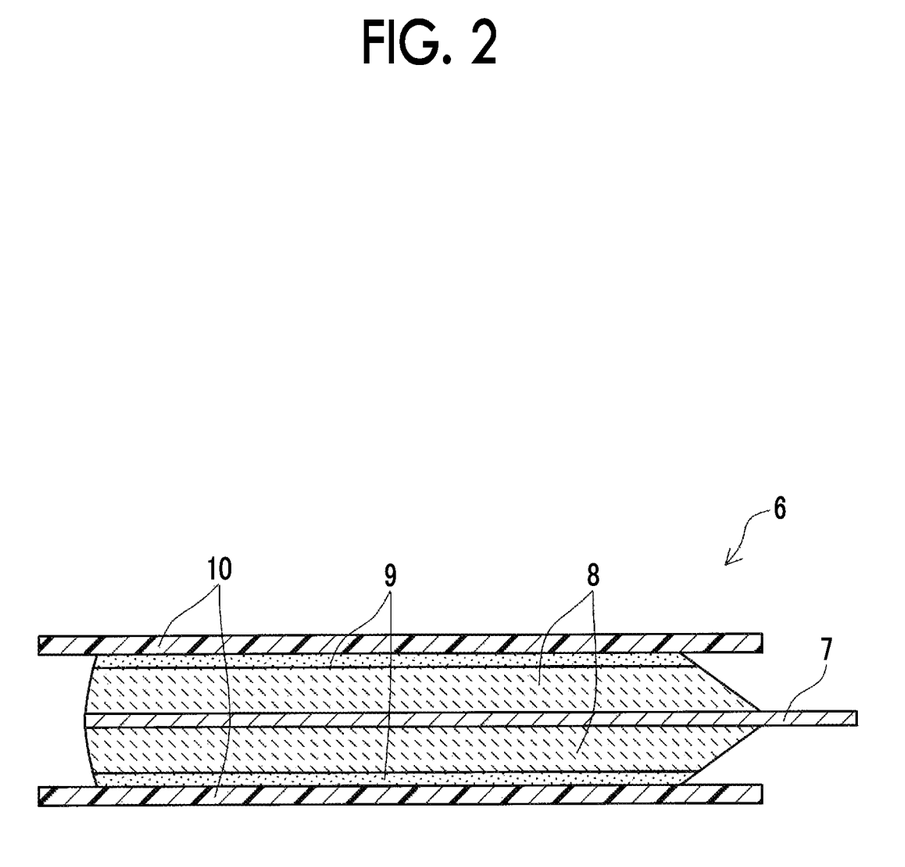
FIG. 2 is a sectional view of an electrode body produced according to the production method of the embodiment.

Here, in the facility shown in FIG. 1, the heat resistant layer 9 and the separator layer 10 are formed on only one side of the electrode body 6 shown in FIG. 2. Coating in the coating unit 1 and bonding in the bonding unit 2 are performed on the other side thereof to obtain the structure in FIG. 2. In addition, in FIG. 1, while the current collection foil 7 with a surface on which the electrode mixture layer 8 is formed in advance is used as an original plate, the present disclosure is not limited thereto. The current collection foil 7 on which no electrode mixture layer 8 is formed may be used as an original plate and a processing unit configured to form the electrode mixture layer 8 may be provided at the upstream side of the coating unit 1. In addition, the electrode mixture layer 8, the heat resistant layer 9, and the separator layer 10 may be formed on only one side of the current collection foil 7, and then the electrode mixture layer 8, the heat resistant layer 9, and the separator layer 10 may be formed on the other side in this order, or only the electrode mixture layer 8 may be formed on both front and rear surfaces in advance.

Here, in the present embodiment, the electrode plate 12 taken out of the coating unit 1 in FIG. 1 is supplied to the bonding unit 2 without a drying process. That is, when the separator layer disposing process is performed by the bonding unit 2, the heat resistant layer 9 is still in a wet state. The separator film 13 is bonded to the wet heat resistant layer 9. Thereafter, the drying process is performed by the drying unit 3. Therefore, the heat resistant layer 9 is dried. Therefore, in the electrode body 6 in FIG. 2 produced in the present embodiment, adhesiveness between the heat resistant layer 9 and the separator layer 10 is favorable. This is because, when the heat resistant layer 9 and the separator film 13 are bonded, the heat resistant layer 9 is still in a wet state.

[Bonding in Wet State]

Examples will be described below. The present examples include examples of producing a negative electrode body (the electrode body 6) for a lithium ion secondary battery and comparative examples. The electrode plate 11, which is an original plate in the present example, is obtained by forming a negative electrode mixture layer (the electrode mixture layer 8) on a surface of a copper foil (the current collection foil 7). The negative electrode mixture layer is a layer containing graphite particles as negative electrode active material particles and various additives as described in, for example, paragraph [0048] in Japanese Unexamined Patent Application Publication No. 2017-027928 (JP 2017-

027928 A). The coating unit 1 in the present example is a gravure coating machine. The separator film 13 is a porous polyethylene film. This porous film contains many pores with a diameter of about several tens of nm.

A coating material used for coating in the coating unit 1 is a liquid heat resistant material obtained by kneading heat resistant insulating material particles in a kneading solvent. Alumina and boehmite can be used as the heat resistant insulating material particles. Here, the heat resistant insulating material particles have a diameter of about 1 μm to 2 μm that is not small enough to enter pores in the separator layer 10. The kneading solvent is a liquid in which a binder is mixed with water or a solvent. Therefore, the heat resistant layer 9 after the drying process becomes a layer in which the heat resistant insulating material particles are deposited and includes gaps between particles. Table 1 shows details of coating materials, the adhesion strength, and determinations of Comparative Example 1 and Examples 1 to 4.

TABLE 1

|  | Kneading solvent | Viscosity | Adhesion strength | Determination |
|---|---|---|---|---|
| Comparative Example 1 | — | — | 5 | C |
| Example 1 | NMP/PVdF | 53 | 27 | B |
| Example 2 |  | 125 | 41 | A |
| Example 3 | Water/CMC | 51 | 36 |  |
| Example 4 |  | 123 | 49 |  |

Comparative Example 1 is an example in which the separator film 13 was directly bonded to the negative electrode mixture layer without performing coating by the coating unit 1. Therefore, in Table 1, the column of kneading solvent and the column of viscosity are left blank. Examples 1 and 2 are examples in which a mixture of N-methyl-2-pyrrolidone and polyvinylidene fluoride was used as a kneading solvent. Examples 3 and 4 are examples in which a mixture of water and carboxymethyl cellulose was used as a kneading solvent.

In Table 1, the column of "viscosity" shows the viscosity [mPa·s] of the coating material. The viscosity of the coating material increases as a formulation proportion of the solid component increases and decreases as a formulation proportion of the solid component decreases. Here, the viscosity was measured at 20 [1/s], 25° C. In Examples 1 to 4, coating materials whose formulation proportions were adjusted to obtain the viscosity shown in the column in Table 1 were used for coating in the coating unit 1. Here, drying conditions in the drying unit 3 were appropriately determined so that the heat resistant layer 9 was sufficiently dried.

In Table 1, the column of "adhesion strength" shows the adhesion strength [mN/cm] between the heat resistant layer 9 and the separator layer 10 after the drying process. Specifically, the adhesion strength was measured by a 90° tape peeling test. Of course, a higher value of the adhesion strength indicates a better result. Here, in Table 1, the column of "determination" shows the result obtained by determining a quality of the electrode body 6 based on the value of the adhesion strength. Here, when the value of the adhesion strength was less than 10, the determination was "C," when the value of the adhesion strength was 10 or more, the determination was "B," and in particular, when the value of the adhesion strength was 30 or more, the determination was "A."

Since the adhesion strength was insufficient, Comparative Example 1 was determined as C. This is thought to have been caused by poor adhesiveness of the separator layer 10 according to the separator layer disposing process that was performed on drying surfaces. This is because, when drying surfaces were bonded, an adhesive force only due to an anchor effect was obtained, and the absolute value of the adhesion strength was low.

All of Examples 1 to 4 were determined as B or A because the adhesion strength was 10 or more. This is thought to have been caused by an effect due to the separator layer disposing process that was performed on the wet heat resistant layer 9. That is, when the separator layer disposing process was performed, a liquid kneading solvent was provided on a surface of the heat resistant layer 9. Then, in the kneading solvent, a binder (PVdF or CMC) was dissolved. Therefore, adhesiveness was obtained due to a chemical bonding force of the binder between the heat resistant layer 9 and the separator layer 10. Therefore, a more favorable adhesion strength than in Comparative Example 1 was obtained.

Figure 3:
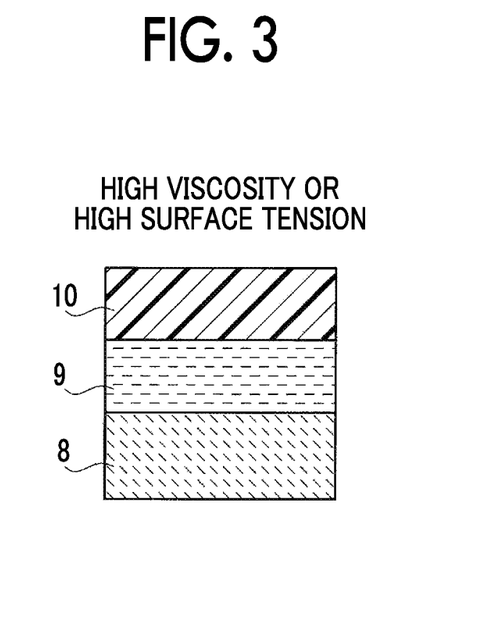
FIG. 3 is a sectional view showing a state in which a solvent does not penetrate into an electrode mixture layer and a separator layer.

In addition, Examples 2 and 4 had a more favorable adhesion strength than Examples 1 and 3 and were determined as A. This is due to a difference in viscosity of the coating materials used for coating. That is, in Example 2, a coating material with a higher viscosity than that in Example 1 was used for coating. In Example 4, a coating material with a higher viscosity than that in Example 3 was used. In Examples 2 and 4, since the coating materials had a high viscosity, hardly any coating materials penetrated into the electrode mixture layer 8 (FIG. 3). Therefore, an effect of increasing an adhesive force due to the binder was obtained in correlation with an amount added.

Figure 4:
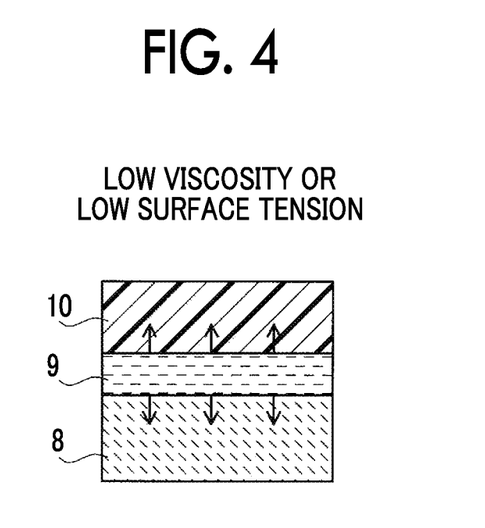
FIG. 4 is a sectional view showing a state in which a solvent penetrates into an electrode mixture layer and a separator layer.

On the other hand, in Examples 1 and 3 in which the viscosity of the coating materials was not so high, some of the coating material penetrated into the electrode mixture layer 8 which is a porous layer. Similarly, a small amount of the coating material penetrated into pores in the separator layer 10 (FIG. 4). Therefore, an effect of increasing an adhesive force due to the binder was partially cancelled. Therefore, in Examples 2 and 4, a more favorable adhesion strength than those in Examples 1 and 3 was obtained. Here, as results of additional tests, it was found that an effect due to the high viscosity of the coating material was obtained at a viscosity of 100 [mPa·s] or more.

In addition, Example 3 had the viscosity of the coating material that was almost the same as that in Example 1, and had an adhesion strength that was lower than those in Examples 2 and 4 but was higher than that in Example 1. Based on such results, Example 3 was determined as A. This is based on a difference between types of kneading solvents. That is, an organic-based kneading solvent was used in Example 1, and a water-based kneading solvent was used in Example 3. Therefore, a surface tension of the kneading solvent was higher in Example 3 than in Example 1. Accordingly, the coating material of Example 3 was less likely to penetrate into the electrode mixture layer 8 than the coating material of Example 1, and similarly, was unlikely to penetrate into pores in the separator layer 10. Therefore, a stronger effect of increasing an adhesive force due to the binder than in Example 1 was exhibited.

Here, when comparing Example 2 and Example 4, similarly, Example 4 in which a water-based kneading solvent was used exhibited an excellent adhesion strength. Accordingly, it can be noted that a kneading solvent based on a liquid having a high surface tension is excellent as the kneading solvent.

[Uneven Pattern]

Figure 5:
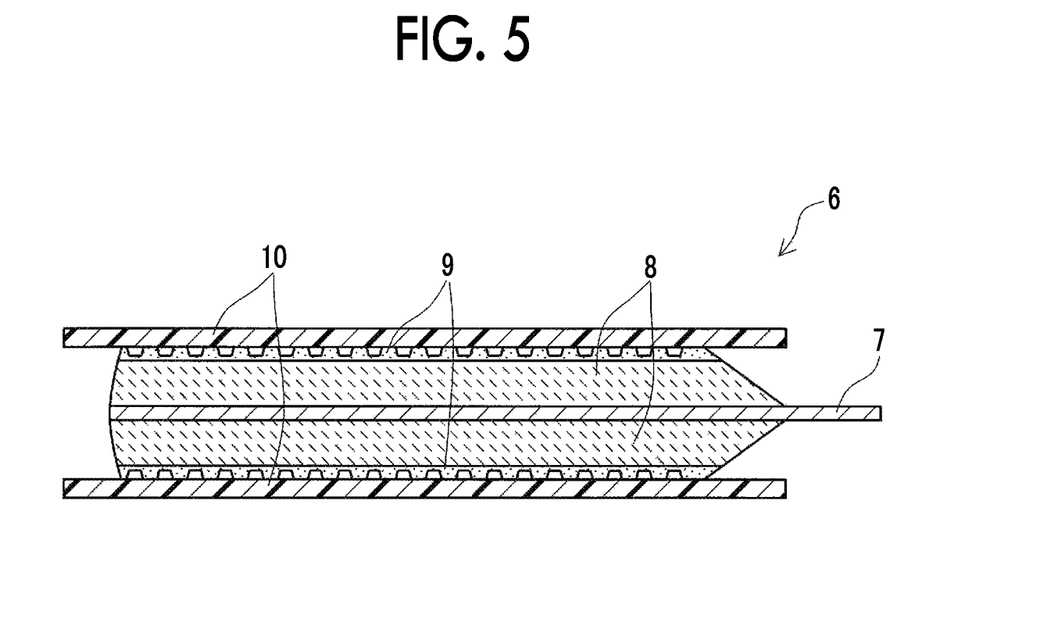
FIG. 5 is a sectional view of an electrode body having an uneven pattern on a surface of a heat resistant layer.
Figure 6:
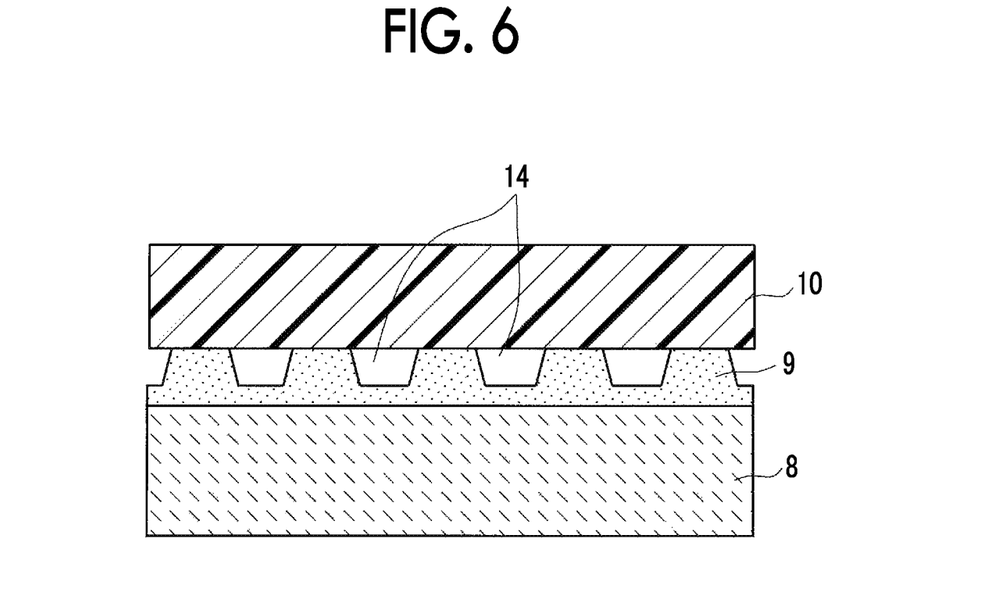
FIG. 6 is an enlarged view of a part in FIG. 5.

In the present embodiment, it is possible to form an uneven pattern on the surface of the heat resistant layer 9. FIG. 5 shows a sectional view of the electrode body 6 having an uneven pattern on the surface of the heat resistant layer 9. FIG. 6 is an enlarged view of a part in FIG. 5. As shown in FIG. 6, gap parts 14 are periodically provided between the heat resistant layer 9 having an uneven pattern and the separator layer 10. When an uneven pattern is formed on the surface of the heat resistant layer 9, there is an advantage that the heat resistant layer 9 is likely to be dried by the drying unit 3. Since the gap parts 14 between the heat resistant layer 9 and the separator layer 10 serve as discharge paths for the solvent component in the heat resistant layer 9, the heat resistant layer 9 is likely to be dried. On the other hand, when the heat resistant layer 9 has a flat surface, the discharge paths for the solvent component are only pores in the separator layer 10 and time is taken for drying according thereto.

When the heat resistant layer 9 has a flat surface, a high rate characteristic of a completed battery may deteriorate. This is because, when charging and discharging are performed at a high rate, the resistance of the battery is likely to increase. The reason for this is inferred to be the fact that a salt concentration of an electrolytic solution between electrodes is non-uniform. When charging and discharging are performed at a high rate, the electrolytic solution between the electrodes is discharged from an electrode laminate due to the expansion and contraction of the electrodes and the electrolytic solution is absorbed between the electrodes from outside of the electrode laminate. This is because a moving resistance is high when movement paths of the electrolytic solution at this time are only pores in the separator layer 10. Such an adverse effect is not exhibited when an uneven pattern is formed on the surface of the heat resistant layer 9. This is because the gap parts 14 serve as movement paths of the electrolytic solution.

Formation of an uneven pattern on the surface of the heat resistant layer 9 can be performed at the same time as when coating is performed by the coating unit 1. That is, when the coating unit 1 is a gravure coating machine, it is sufficient to form an uneven pattern on a surface of a gravure roll and rotate the gravure roll in a forward direction. Alternatively, a processing unit configured to form an uneven pattern may be separately provided immediately after the coating unit 1.

Figure 7:
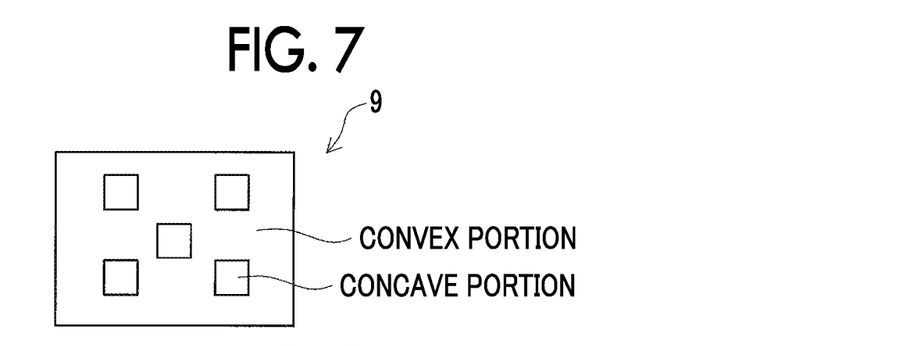
FIG. 7 is a plan view showing a first example of the uneven pattern on the surface of the heat resistant layer.
Figure 8:
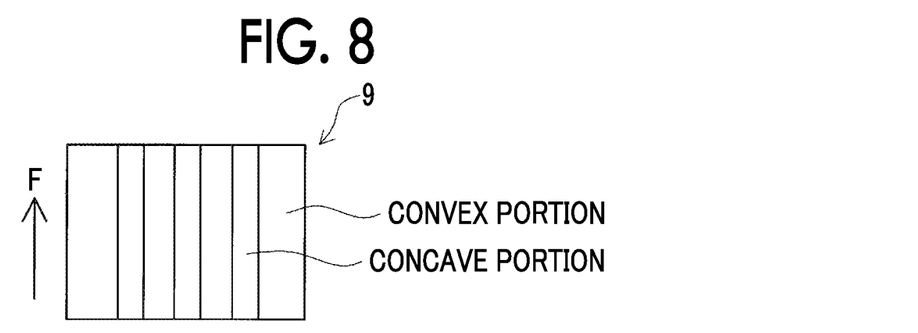
FIG. 8 is a plan view showing a second example of the uneven pattern on the surface of the heat resistant layer.
Figure 9:
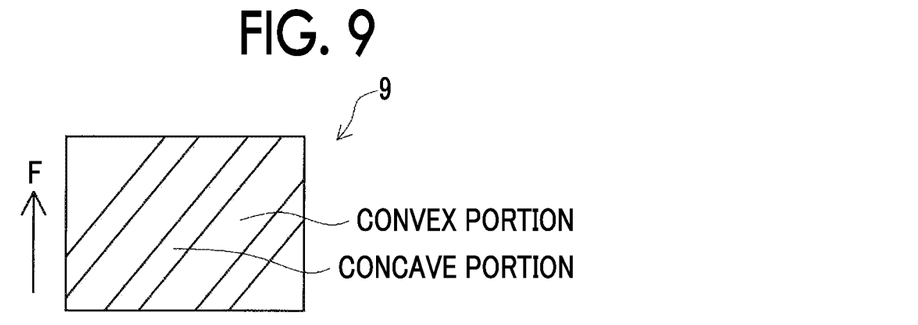
FIG. 9 is a plan view showing a third example of the uneven pattern on the surface of a heat resistant layer.

FIG. 7 to FIG. 9 show exemplary uneven patterns on the surface of the heat resistant layer 9. The pattern in FIG. 7 is a pattern in which dot-shaped concave portions are discretely disposed in a continuous convex portion. The pattern in FIG. 8 is a strip pattern (strip shape) in which both convex portions and concave portions are linearly continuous and directions thereof are parallel to a conveying direction F of the electrode plate 11 in the production facility in FIG. 1. The pattern in FIG. 9 is a strip pattern (strip shape) in which directions of linearly continuous convex portions and concave portions are inclined with respect to the conveying direction F. Here, setting directions of the linear convex portions and concave portions to directions perpendicular to the conveying direction F is not possible in consideration of characteristics of gravure coating. The pattern in FIG. 10 is a pattern in which dot-shaped convex portions are discretely disposed in a continuous concave portion unlike the pattern in FIG. 7.

Table 2 shows Examples 5 to 9 for showing an effect of an uneven pattern. In Table 2, the column of "drying time" is a time required for completely drying the heat resistant layer 9 by the drying unit 3. Here, specifically, the drying time is a time required (unit: second) until a water content of the electrode body 6 measured by a Karl Fisher method reached 300 ppm or less when an ambient temperature was set to 110° C. The column of "rate of increase in resistance" shows a degree of increase in resistance due to charging and discharging at a high rate of a completed battery (an electrode laminate is a card laminated type). Specifically, the ratio of the resistance value between before and after a high rate charging and discharging test over 100 cycles is indicated by "%." In Example 8, an angle of an oblique line with respect to the conveying direction F was 45°. Here, in all of Examples 5 to 9, types and viscosities of kneading solvents were the same as those in Example 4 in Table 1.

TABLE 2

Figure 10:
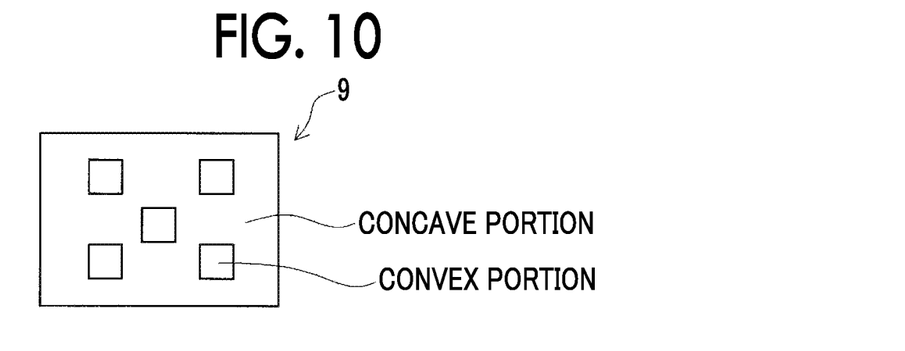
FIG. 10 is a plan view showing a fourth example of the uneven pattern on the surface of the heat resistant layer.

|  | Uneven pattern | Drying time | Rate of increase in resistance |
| --- | --- | --- | --- |
| Example 5 | None | 45 | 300 |
| Example 6 | FIG. 7 (concave dot) | 40 | 250 |
| Example 7 | FIG. 8 (vertical line) | 39 | 129 |
| Example 8 | FIG. 9 (oblique line) | 17 | 122 |
| Example 9 | FIG. 10 (convex dot) | 8 | 103 |

In Example 5 (without uneven pattern), the drying time was long and the rate of increase in resistance was also high. In Example 6 (concave dot pattern), the drying time and the rate of increase in resistance were somewhat improved compared to Example 5, but extents of improvement thereof were small. The reason for this is inferred to be the fact that the gap parts 14 were not connected to the outside due to the concave dot pattern. Due to such pattern characteristics, an effect of the uneven pattern was weak. However, in Examples 5 and 6, there was no problem in adhesiveness (Table 1) between the heat resistant layer 9 and the separator layer 10, and there was no particular problem in battery performance under non-high rate usage conditions.

In Example 7 (vertical line pattern), the drying time was not much different from that in Example 6, but the rate of increase in resistance was almost halved. The reason why the drying time was not much different is inferred to be as follows. In a vertical line uneven pattern, since the gap parts 14 in FIG. 6 were not connected to the outside, a function as a water discharge path was limited to a low level. On the other hand, when a card laminated type electrode laminate was formed, the gap parts 14 were connected to the outside even in a vertical line uneven pattern. Therefore, it can be understood that there will be some effect on the rate of increase in resistance.

In Example 8 (oblique line pattern), the drying time was shortened to about half of that in Example 7. The reason for this is inferred to be as follows. In an oblique line uneven pattern, during the drying process performed by the drying unit 3, the gap parts 14 were connected to the outside, and a function as a water discharge path was exhibited. The rate of increase in resistance was not much different from that in Example 7.

In Example 9 (convex dot pattern), both the drying time and the rate of increase in resistance had the most outstanding values in Table 2. The reason for this is inferred to be as follows. Since concave portions were connected vertically and horizontally in the convex dot pattern, the gap parts 14 sufficiently exhibited their functions during drying and during charging and discharging. Here, in the case of the oblique line pattern or convex dot pattern, it can be understood that, even if a battery including a wound type electrode laminate is produced, an effect of reducing the rate of increase in resistance will be obtained. Thus, in Table 2, the lower rows have better results for the drying time and the rate of increase in resistance. Here, a preferable range of the drying time is 30 seconds or less and more preferably 20 seconds or less. A preferable range of the rate of increase in resistance is 150% or less, and more preferably 130% or less. Here, while the same kneading solvent as in Example 4 in Table 1 was used for samples in Table 2, the same kneading solvent used for any of Examples 1 to 3 may be used.

Here, the sizes of the above uneven patterns are as follows. In the patterns in FIG. 8 and FIG. 9, regarding the size of the convex portion when viewed in a plan view, the width of the linear convex portion is preferably 500 μm or less. In the pattern in FIG. 10, similarly, one side (a diameter in a circle) of the dot-shaped convex portion is preferably 500 μm or less. In short, a distance between a location in the convex portion and the concave portion may be a maximum of 250 μm or less. This is beneficial for obtaining an effect of shortening the drying time.

In addition, the depth of the gap parts 14 when viewed in a sectional view (FIG. 6) is preferably 1.5 times or more the thickness of the heat resistant layer 9 in the portion (concave portion). In other words, a distance between a first surface of the convex portion with which the separator layer comes in contact and a second surface of the concave portion faced on the separator layer is preferably at least 1.5 times as long as a distance between the electrode mixture layer and the second surface. This is beneficial for the gap parts 14 to function sufficiently as a discharge path for the solvent component. In addition, the thickness of the heat resistant layer 9 in the concave portion is preferably 2 μm or more. In other words, the distance between the electrode mixture layer and the second surface is preferably 2 μm or more. This is beneficial for securing safety when a battery is charged and discharged at a high rate.

[Mixing in Ethanol]

In the present embodiment, an additive for lowering a surface tension of the kneading solvent can be mixed into the coating material for coating in the coating unit 1. As such an additive, ethanol can be exemplified. When ethanol is added to the coating material, there is an advantage that a drying time of the heat resistant layer 9 in the drying unit 3 can be shortened. A solvent into which ethanol is mixed has a low surface tension. The solvent that is in a liquid phase enters pores in the separator layer 10 and additionally, it can be discharged to the outside. That is, when ethanol is added, pores in the separator layer 10 can be used as a discharge path for the solvent component. Therefore, the drying time can be shortened accordingly.

TABLE 3

| | Amount of ethanol added | Drying time | Surface tension |
|---|---|---|---|
| Example 10 | Not added | 38 | 72.7 |
| Example 11 | 3 | 35 | 71.3 |
| Example 12 | 5 | 19 | 61 |
| Example 13 | 17 | 14 | 48 |
| Example 14 | 30 | 7 | 30 |
| Comparative Example 2 | 35 | — | 24 |

Table 3 shows Examples 10 to 14 and Comparative Example 2 for showing an effect of ethanol added. In Table 3, the "amount of ethanol added" indicates an amount of ethanol added to the kneading solvent. Here, an amount replaced with ethanol in a base liquid (water or a solvent) of the kneading solvent is indicated by weight %. The column of "drying time" is the same as the column of "drying time" in Table 2. The column of "surface tension" shows a value [dyn/cm] of the surface tension of a base liquid (including ethanol except for Example 10) of the kneading solvent measured by a suspension method. Here, in samples in Table 3, components other than ethanol in the kneading solvent were adjusted in the same manner as in Example 4 in Table 1. In addition, no uneven pattern was formed on the surface of the heat resistant layer 9.

First, in the column of "surface tension" in Table 3, Example 10 in which no ethanol was added has a maximum value. The lower rows in Table 3 have a lower value of the surface tension, that is, a larger amount of ethanol added resulted in a lower value. This result conforms to theory. More specifically, in Example 11 in which a minimum amount of ethanol was added, a reduction in surface tension was very small. On the other hand, in Example 12 and examples in rows therebelow, an amount of reduction that can be considered as a significant change compared to Examples 10 and 11 was observed.

Next, regarding the column of "drying time," the following can be understood. First, in Example 10 (ethanol not added) and Example 11 (minimum amount of ethanol added), the drying time was considerably lengthened. This is because, since the surface tension of the solvent was high, the solvent in a liquid phase could not enter pores of the separator layer 10, and only vapor of the solvent could use pores as discharge paths. Thus, there is a slight difference between Example 10 and Example 11. Therefore, when an amount of ethanol added is about 3 weight %, it can be considered that an effect of shortening the drying time is weak. Here, Example 10 had substantially the same conditions as Example 5 in Table 2, but had a somewhat different drying time. This is because the actually measured drying time was influenced by environmental conditions and the like during measurement.

In Examples 12 to 14 (amount of ethanol added of 5 to 30%), the drying time was less than 20 seconds. That is, the drying time was significantly shortened compared to Examples 10 and 11. This is because, since the surface tension of the solvent was low, the solvent in a liquid phase entered pores in the separator layer 10 and pores could be used as discharge paths. Here, in Examples 12 to 14, it is thought that some of the binder in the solvent also entered pores in the separator layer 10, and additionally, some of the binder remained in pores. However, in consideration of an amount of the binder added, it is thought that the remaining amount was not sufficient to inhibit a movement path of the electrolytic solution in the battery. In Examples 12 to 14, it can also be understood that the surface tension of the solvent could be lowered without increasing an amount of the binder added to the solvent. That is, it can be understood that the drying time can be shortened without increasing the battery resistance due to an excess amount of added binder.

In Comparative Example 2 in which an amount of ethanol added was increased further, the column of drying time is left blank. This is because, in Comparative Example 2, bonding of the separator layer 10 was not successful, and only the separator layer 10 having poor adhesiveness as in Comparative Example 1 in Table 1 was obtained. Therefore, in Comparative Example 2, the drying time was not measured. This can be understood to indicate that, since an amount of ethanol added was too large, the volatility of the solvent was too high. Therefore, the heat resistant layer 9 was dried before the electrode plate 12 taken out of the coating unit 1 reached the bonding unit 2, and bonding in a dried state occurred as in Comparative Example 1.

As above, an amount of ethanol added is preferably 30 weight % or less, and more preferably 5 weight % or more. Here, while the same kneading solvent as in Example 4 in Table 1 was used for samples in Table 3, the same kneading solvent used for any of Example 1 to Example 3 may be used. In addition, while no uneven pattern was formed on the surface of the heat resistant layer 9 in the samples in Table 3, an uneven pattern may be formed as in Example 6 to Example 9 (in particular, Example 8 or Example 9) in Table 2.

As described above in detail, according to the present embodiment and examples, after a liquid heat resistant material is applied to the electrode plate 11 by the coating unit 1, before the heat resistant layer 9 which is the coating layer is dried, the separator layer 10 is bonded by the bonding unit 2. Thereby, in the produced electrode body 6, favorable adhesiveness of the separator layer 10 is obtained. In addition, an uneven pattern can be formed on a surface of the heat resistant layer 9 formed by coating in the coating unit 1. Therefore, it is possible to ensure discharge paths for the solvent component of the heat resistant layer 9 and shorten a time required for the drying process. In particular, as the uneven pattern, the convex dot pattern is best. In addition, an additive for lowering a surface tension of the solvent such as ethanol can be mixed into a coating material in the coating process. Also in this case, it is possible to shorten a time required for the drying process.

Here, the present embodiment and examples are merely examples, and do not limit the present disclosure. Therefore, it should be noted that various improvements and modifications of the present disclosure can be made without departing from the spirit and scope of the disclosure. For example, the embodiment and examples have been described assuming that a negative electrode body for a lithium ion secondary battery is produced. However, the present disclosure is not limited thereto, and can be applied to a case in which a positive electrode body is produced and a case in which an electrode body of a battery of a type other than a lithium ion secondary battery is produced. In addition, an additive for lowering a surface tension of the kneading solvent is not limited to ethanol, and may be methanol and the like.

What is claimed is:

1. A method for producing an electrode body including a current collection foil, an electrode mixture layer, a heat resistant layer, and a porous separator layer are laminated in this order, the method for producing the electrode body comprising:

applying a liquid heat resistant material forming the heat resistant layer to the electrode mixture layer on the current collection foil;

after applying the liquid heat resistant material, disposing the porous separator layer on the liquid heat resistant material before the liquid heat resistant material is dried; and drying the liquid heat resistant material after disposing the porous separator layer, wherein, when the liquid heat resistant material is applied, an uneven shape including a concave portion and a convex portion is formed on a surface of the liquid heat resistant material on the electrode mixture layer.

2. The method for producing the electrode body according to claim 1, wherein the uneven shape of the liquid heat resistant material includes the concave portion that is continuous and a plurality of the convex portions that is discrete.

3. The method for producing the electrode body according to claim 1, wherein the convex portion is linear, the concave portions is linear, and the uneven shape of the liquid heat resistant material includes a strip shape.

4. The method for producing the electrode body according to claim 1, wherein a solvent component of the liquid heat resistant material includes an additive for lowering a surface tension of the liquid heat resistant material and an amount of the additive in the solvent component is 30 weight % or less.

5. The method for producing the electrode body according to claim 1, wherein a viscosity of the liquid heat resistant material is 100 mPa•s or more.

6. The method for producing the electrode body according to claim 1, wherein the liquid heat resistant material includes water as a solvent component.

7. The method for producing the electrode body according to claim 1, wherein a width of the convex portion is 500 μm or less.

8. The method for producing the electrode body according to claim 1, wherein a distance between a first surface of the convex portion with which the porous separator layer comes in contact and a second surface of the concave portion faced on the porous separator layer is at least 1.5 times as long as a distance between the electrode mixture layer to the second surface, and the distance between the electrode mixture layer and the second surface is 2 μm or more.

9. The method for producing the electrode body according to claim 4, wherein the additive is ethanol.

10. The method for producing the electrode body according to claim 4, wherein the amount of the additive in the solvent component is 5 weight % or more and 30 wt % or less.

* * * * *